(12) United States Patent
Selvaraj

(10) Patent No.: US 9,472,119 B2
(45) Date of Patent: Oct. 18, 2016

(54) COMPUTER-IMPLEMENTED OPERATOR TRAINING SYSTEM AND METHOD OF CONTROLLING THE SYSTEM

(71) Applicant: YOKOGAWA ELECTRIC CORPORATION, Musashino, Tokyo (JP)

(72) Inventor: Sankar Selvaraj, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 13/975,698

(22) Filed: Aug. 26, 2013

(65) Prior Publication Data

US 2015/0056582 A1 Feb. 26, 2015

(51) Int. Cl.
*G09B 19/00* (2006.01)
*G09B 5/02* (2006.01)

(52) U.S. Cl.
CPC ............ *G09B 19/00* (2013.01); *G09B 5/02* (2013.01)

(58) Field of Classification Search
CPC ........ G09B 9/00; G09B 19/00; A63B 24/00; G06F 3/011; G06F 2203/012
USPC ........................................................ 434/219
See application file for complete search history.

(56) References Cited

U.S. PATENT DOCUMENTS

| | | | | |
|---|---|---|---|---|
| 2004/0174431 A1* | 9/2004 | Stienstra | ................. | G06F 3/011 348/155 |
| 2006/0127865 A1* | 6/2006 | Siders | .................... | G09B 19/00 434/219 |
| 2008/0055194 A1* | 3/2008 | Baudino | ................. | G06F 3/011 345/8 |
| 2009/0319058 A1* | 12/2009 | Rovaglio | ............... | G05B 17/02 700/17 |
| 2011/0183303 A1* | 7/2011 | Yamamoto | ............. | G05B 17/02 434/219 |
| 2012/0135381 A1* | 5/2012 | Cincotti | .................... | F41H 3/00 434/11 |
| 2014/0004487 A1* | 1/2014 | Cheben | .................. | G06F 3/011 434/219 |

FOREIGN PATENT DOCUMENTS

| | | |
|---|---|---|
| JP | 11-153940 A | 6/1999 |
| JP | 2002-366021 A | 12/2002 |
| JP | 2005-70161 A | 3/2005 |
| JP | 2005-258089 A | 9/2005 |

OTHER PUBLICATIONS

Hirohama Seiya, "Instrumentation Control Engineering," Apr. 1, 2011, vol. 54, No. 4, pp. 61-63.
International Search Report dated Sep. 16, 2014 from the International Searching Authority in counterpart application no. PCT/JP2014/069500.

* cited by examiner

*Primary Examiner* — Robert J Utama
*Assistant Examiner* — Jerry-Daryl Fletcher
(74) *Attorney, Agent, or Firm* — Sughrue Mion, PLLC

(57) ABSTRACT

A computer-implemented training system includes a) a plant replica server; b) a virtual environment reproducer; and c) a motion sensing system. The plant replica server has a plant replica associated with a simulated plant model. The virtual environment reproducer is configured to reproduce a virtual environment of the simulated plant model, based on the plant replica. The motion sensing system is configured to sense motions of a field operator in the virtual environment. The motion sensing system is configured to send an update associated with the sensed motions to the plant replica server. The plant replica server is configured to receive the update from the motion sensing system, and to update the plant replica based on the first type of update associated with the sensed motions, and to reflect the first type of update to the virtual environment reproduced by the virtual environment reproducer.

6 Claims, 13 Drawing Sheets

COMPUTER-IMPLEMENTED OPERATOR TRAINING SYSTEM AND METHOD OF CONTROLLING THE SYSTEM

BACKGROUND OF THE INVENTION

1. Field of the Invention

This disclosure of the present invention generally relates to a computer-implemented training system and a method of controlling the system, and more particularly to a computer-implemented training system for training a field operator alone or together with a console operator using a virtual environment of a plant model, and a method of controlling the system.

2. Backgrounds

The major factor that worries the current HPI operators is safety, both plant and personnel, especially, when the plant is operating at or above design conditions. The underlying issue is the missing capability of identifying and eliminating hazardous scenarios/conditions in the plant. Training the plant resources to handle emergencies was almost always sought to be the best solution in addressing these underlying issues. The operator training system is designed for the training of the distributed control system operators to handle emergencies and other critical operations in a simulated environment. In any process industry, there are a few distributed control system operators and a number of field operators. These operators execute the jobs at the site physically and also face the real emergencies in the plant. Currently, the training mechanisms for this group of people are limited to class rooms and in many cases to OJT. In these cases, trainees are waiting for an emergency to actually happen and learn from them with the help of experienced field operators.

SUMMARY

In one embodiment, a computer-implemented training system may include, but is not limited to, a) a plant replica server; b) a virtual environment reproducer; and c) a motion sensing system. The plant replica server is configured to obtain a simulated plant model. The plant replica server has a plant replica associated with the simulated plant model. The virtual environment reproducer is communicatively coupled to the plant replica server. The virtual environment reproducer is configured to reproduce a virtual environment of the simulated plant model, based on the plant replica. The motion sensing system is communicatively coupled to the plant replica server. The motion sensing system is configured to sense motions of a field operator as a first trainee acting in the virtual environment. The motion sensing system is configured to send a first type of update associated with the sensed motions to the plant replica server. The plant replica server is configured to receive the first type of update associated with the sensed motions from the motion sensing system, and to update the plant replica based on the first type of update associated with the sensed motions, and to reflect the first type of update to the virtual environment reproduced by the virtual environment reproducer.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

[Overall of Training System]

Figure 1:
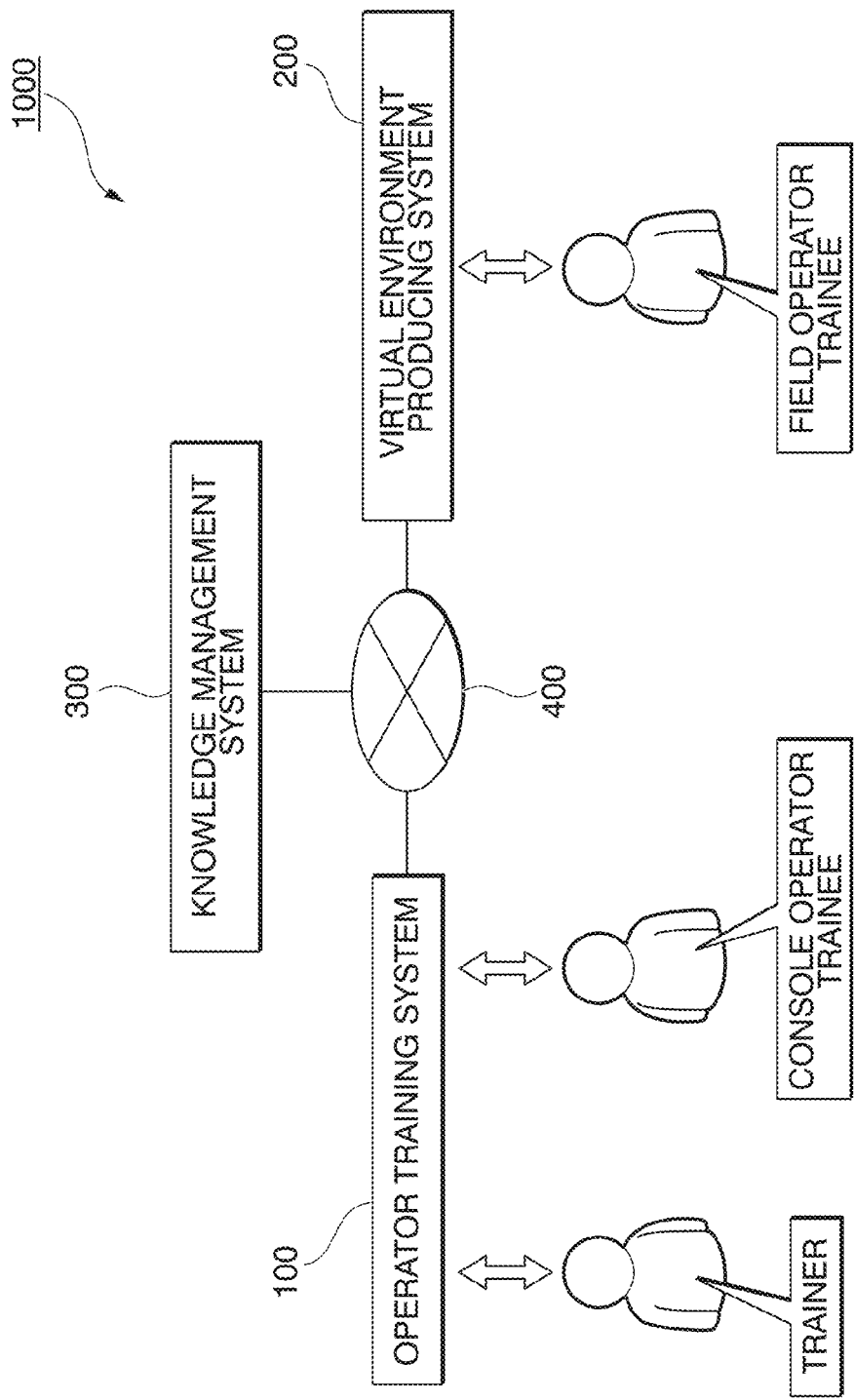
FIG. 1 is a block diagram of a computer-implemented training system in some embodiments of the present invention.

Some illustrative embodiments of the present invention provide a computer-implemented training system and a method of controlling the system. FIG. 1 is a block diagram of a computer-implemented training system in some embodiments of the present invention. A computer-implemented training system 1000 is configured to train a field operator trainee as a first trainee and a console operator trainee as a second trainee under conditions or scenario set by a trainer. The computer-implemented training system 1000 is configured for the field operator trainee and the console operator trainee to perform a series of training operations, in a coordinated way of a training scenario set by the trainer. The computer-implemented training system 1000 is configured to support the trainer, the field operator trainee and the console operator to co-work or cooperate together. The computer-implemented training system 1000 is configured to reproduce a virtual environment of a simulated plant model so as to place the field operator trainee in the virtual environment of the plant model and allow the field operator trainee to interact with the console operator trainee. The computer-implemented training system 1000 is configured to update the virtual environment so as to allow the field operator trainee and the console operator trainee to work cooperatively in the coordinated way of training scenario set by the trainer.

With reference to FIG. 1, the computer-implemented training system 1000 can be implemented by an integrated system. The computer-implemented training system 1000 includes an operator training system 100, a virtual environment producing system 200, and a knowledge management system 300. Those systems 100, 200 and 300 are communicatively coupled to each other. The term "communicatively coupled" means that communications are possible among the systems 100, 200 and 300 in any available way. The term "communicatively coupled" does not mean limiting any specific way of communications among the systems 100, 200 and 300. Typically, the systems 100, 200 and 300 can be connected via a network 400 which is available. There do not need to limit any specific network. The network 400 can be any available hub, wired or wireless network. The network can be a private network or a public network alone or in combination. In some cases, the systems 100, 200 and 300 can be connected to each other via any available hub for allowing communications among the systems 100, 200 and 300. In other cases, the systems 100, 200 and 300 can be connected to each other via any available wireless network for allowing communications among the systems 100, 200 and 300. In still other cases, the systems 100, 200 and 300 can be connected to each other via any available wired network for allowing communications among the systems 100, 200 and 300.

With reference again to FIG. 1, the operator training system 100 is configured to be accessible, operable and controllable by the trainer and the console operator trainee. The virtual environment producing system 200 is configured to place the field operator trainee in the virtual environment of the simulated plant model and to provide bidirectional interfaces to the field operator trainee in the virtual environment. The knowledge management system 300 is configured to support for taking place training tests for the field operator trainee and the console operator trainee in at least one of 1) standard operating procedures, 2) start-up and shutdown procedures, 3) emergency procedures, and 4) best practices. The knowledge management system 300 is configured to store new best practices from training session using the computer-implemented training system 1000.

The computer-implemented training system 1000 is configured to allow the operation training system 200 and the virtual environment producing system 200 each to obtain the updated virtual environment which is reflected by the updated scenario of the trainer, the updated console operations of the console operator trainee, and the updated motions or responses of the field operator trainee. The computer-implemented training system 1000 is configured to allow the virtual environment producing system 200 for the field operator trainee to reproduce the updated virtual environment which is reflected by the updated scenario of the trainer, the updated console operations of the console operator trainee, and the updated motions or responses of the field operator trainee. The computer-implemented training system 1000 is configured to allow the operator training system 100 for the trainer and the console operator trainee to display the updated scenario of the trainer, the updated console operations of the console operator trainee, and the updated motions or responses of the field operator trainee. The computer-implemented training system 1000 is configured for the field operator trainee and the console operator trainee to perform a series of training operations, in the coordinated way of the training scenario set by the trainer, and for the trainer to supervise the field operator trainee and the console operator trainee. The field operator trainee and the console operator trainee both will be aware of consequences of other's actions to work together in the coordinated way to handle the current status.

[Configuration of Training System]

Figure 2:
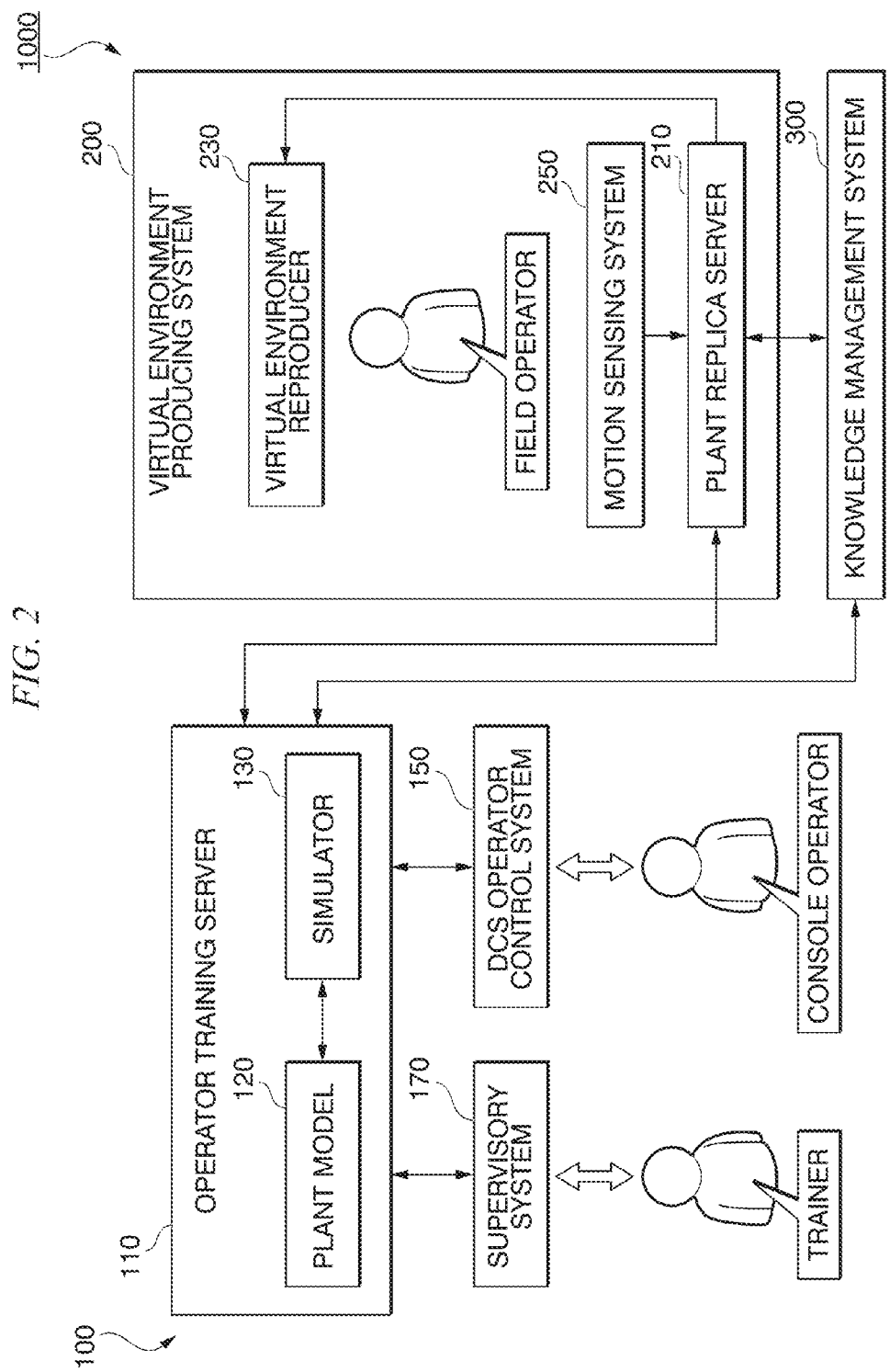
FIG. 2 is a block diagram of an illustrative example of the configurations of the computer-implemented training system of FIG. 1.

FIG. 2 is a block diagram of an illustrative example of the configurations of the computer-implemented training system 1000 of FIG. 1. As described above, the computer-implemented training system 1000 includes the operator training system 100, the virtual environment producing system 200, and the knowledge management system 300, where the systems 100, 200, and 300 are communicatively coupled to each other via the network 400.

The operator training system 100 may include, but is not limited to, an operator training server 110, a distributed control system (DCS) operator control system 150, and a supervisory system 170. The operator training server 110 may further include, but is not limited to, a plant model 120 and a simulator 130. The plant model 120 is configured to provide plant-model-related data which is related to each of one or more plant models for virtual training. The simulator 130 is configured to simulate the plant model of the plant model 120 in accordance with input conditions for simulation and to generate a simulated plant model. The initial plant model which has not yet been simulated is a steady model. Simulation of the steady plant model will be turned into a dynamic model.

The virtual environment producing system 200 may include, but is not limited to, a plant replica server 210, a virtual environment reproducer 230, and a motion sensing system 250. The plant replica server 210 is communicatively coupled to the operator training system 100. The plant replica server 210 is also communicatively coupled to the knowledge management system 300. The plant replica server 210 is also communicatively coupled to the virtual environment reproducer 230. The plant replica server 210 is also communicatively coupled to the motion sensing system 250.

The supervisory system 170 is configured to provide a first user interface for the trainer to access, operate and control the operator training server 110. The supervisory system 170 as the first user interface is communicatively coupled to the operator training server 110. The supervisory system 170 is configured for the trainer to set conditions for generating a training scenario and to set conditions for simulation by the simulator 130 of the plant model and to generate the simulated plant model. The operator training server 110 is configured to send the plant replica server 210 an update associated with the generated training scenario. The operator training server 110 is configured to send the plant replica server 210 the plant-model-related-data which is associated with the simulated plant model for allowing the field operator trainee and the console operator trainee to train using the simulated plant model and in accordance with the generated training scenario. The supervisory system 170 is configured to display the simulated plant model and the training scenario to allow the trainer to recognize the simulated plant model and the training scenario which are used for the field operator trainee and the console operator trainee to train or work together in the coordinated way of following the generated training scenario.

The distributed control system (DCS) operator control system 150 is configured to provide a second user interface for the console operator trainee to access and operate the operator training server 110. The distributed control system (DCS) operator control system 150 is configured to display the simulated plant model and the training scenario to allow the console operator trainee to recognize the simulated plant model and the training scenario which are used for the field operator trainee and the console operator trainee to train or work together in the coordinated way of following the generated training scenario. The distributed control system (DCS) operator control system 150 is configured for the console operator trainee to enter console operations as training into the operator training server 110 during the training session. The operator training server 110 is configured to send the plant replica server 210 an update associated with the console operations by the console operator trainee for allowing the field operator trainee and the console operator trainee to train in the coordinated way of following the generated training scenario.

Figure 9:
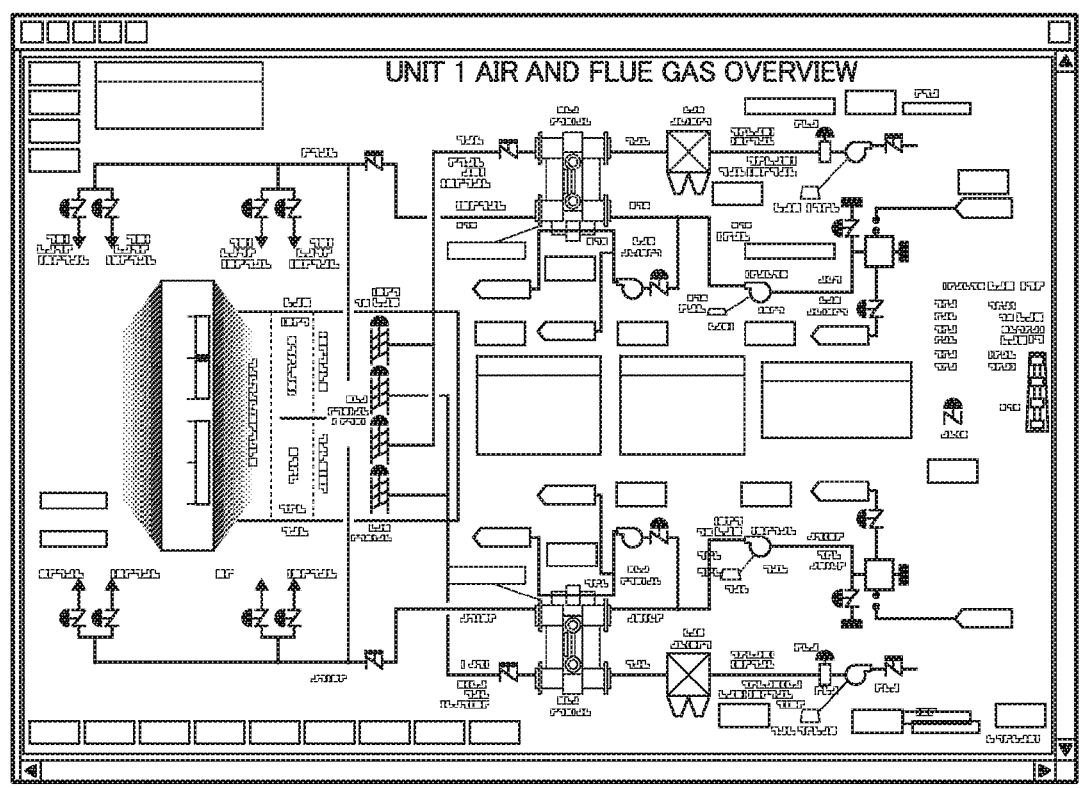
FIG. 9 is a view of an example of a simulated two-dimensional plant model displayed by the computer-implemented training systems of FIGS. 1-6.
Figure 10:
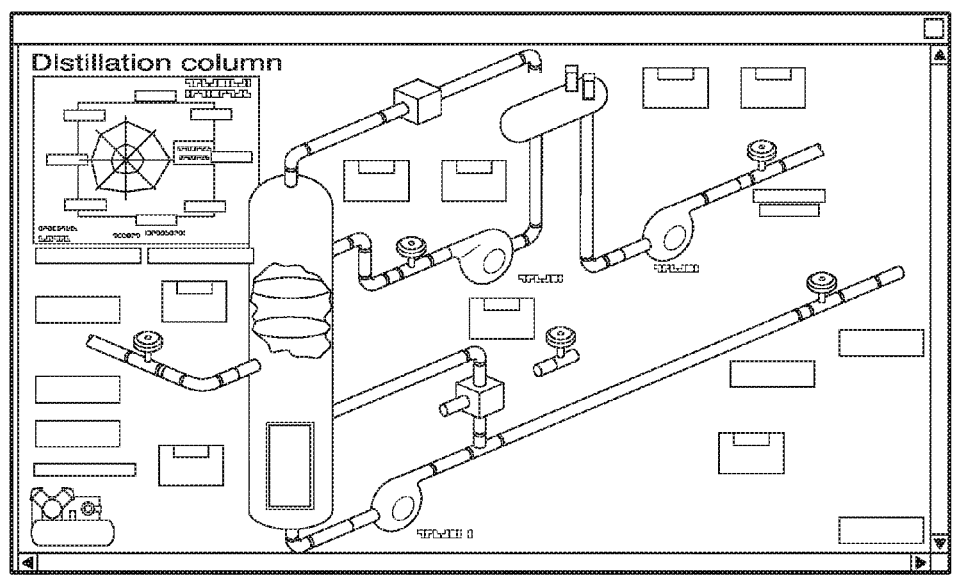
FIG. 10 is a view of an example of a simulated three-dimensional plant model displayed by the computer-implemented training systems of FIGS. 1-6.

FIG. 9 is a view of an example of a simulated two-dimensional plant model as the plant model 120 displayed by the supervisory system 170 and by the distributed control system (DCS) operator control system 150 as the plant model 120 in the operator training system 100. FIG. 10 is a view of an example of a simulated three-dimensional plant model as the plant model 120 displayed by the supervisory system 170 and by the distributed control system (DCS) operator control system 150 as the plant model 120 in the operator training system 100.

Figure 11:
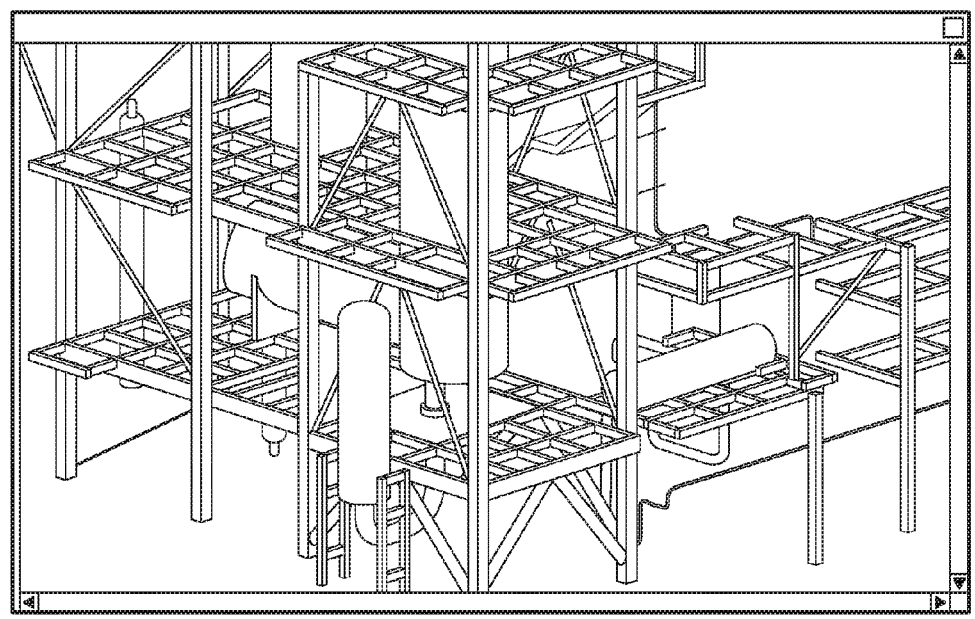
FIG. 11 is a view of an example of a plant replica as a constructed/actual three dimensional plant model with scaled dimensions displayed by the computer-implemented training systems of FIGS. 1-6.

The plant replica server 210 is configured to receive the plant-model-related data that is related to the plant model with virtual environments, from the operator training server 110. The plant replica server 210 is configured to hold the plant replica which is the same as the plant model in the plant model 120. The plant replica server 210 is configured to receive the update associated with the generated new training scenario set by the trainer using the supervisory system 170 and to update the plant-model-related data that is related to the plant model with virtual environments. The plant replica server 210 is configured to receive the update associated with the console operation made by the console operator trainee using the distributed control system (DCS) operator control system 150 and to update the plant-model-related data that is related to the plant model with virtual environments. The plant replica server 210 is configured to send the updated plant-model-related data to the virtual environment reproducer 230. The updated plant-model-related data is related to the simulated plant model with virtual environments which is reflected by the updates based on the new training scenario and on the console operation. FIG. 11 is a view of an example of a plant replica as a constructed/actual three dimensional plant model with scaled dimensions. The plant replica provides the scaled dimensions of each structure in three-dimensions and the relative distances between the structural elements of the plant. The plant replica allows the field operator trainee to navigate around the structures of the plant such as equipment(s), and pipe(s).

The virtual environment reproducer 230 is communicatively coupled to the plant replica server 210. The virtual environment reproducer 230 is configured to receive the updated plant-model-related data from the operator training server 110 and to reproduce the virtual environment using the updated plant-model-related data. The virtual environment reproducer 230 can be implemented by any available projector configured to display an image of the virtual environment.

The motion sensing system 250 is communicatively coupled to the plant replica server 210. The motion sensing system 250 is configured to sense motions of the field operator trainee acting in the virtual environment and in response to the training scenario. The motion sensing system 250 is configured to generate update signals associated with the sensed motions or the field operator trainee's response. The motion sensing system 250 is configured to send the update associated with the sensed motions to the plant replica server 210 and the operation training server 110. The virtual environment reproducer 230 is configured to receive the update associated with the sensed motions from the plant replica server 210 and reproduce newly updated motions of the field operator trainee in the virtual environment. In other words, the virtual environment reproducer 230 is configured to reproduce newly updated virtual environment which is reflected by the sensed motions or the updated response to the training scenario.

The virtual environment reproducer 230 is configured to receive the third type of update indirectly from the motion sensing system 250 through the plant replica server 210 and to receive the second type of update and the third type of update indirectly from the operator training server 110 through the plant replica server 210. The second type of update is an update associated with the sensed motions of the field operator trainee sensed by the motion sensing system 250. The second type of update is an update associated with the scenario generated or set by the trainer by using the supervisory system 170. The third type of update is an update associated with the console operations of the console operator trainee by using the distributed control system (DCS) operator control system 150. The virtual environment reproducer 230 is configured to reproduce the updated virtual environment that is reflected by the updated scenario of the trainer, the updated console operations of the console operator trainee, and the updated motions or responses of the field operator trainee.

Figure 12:
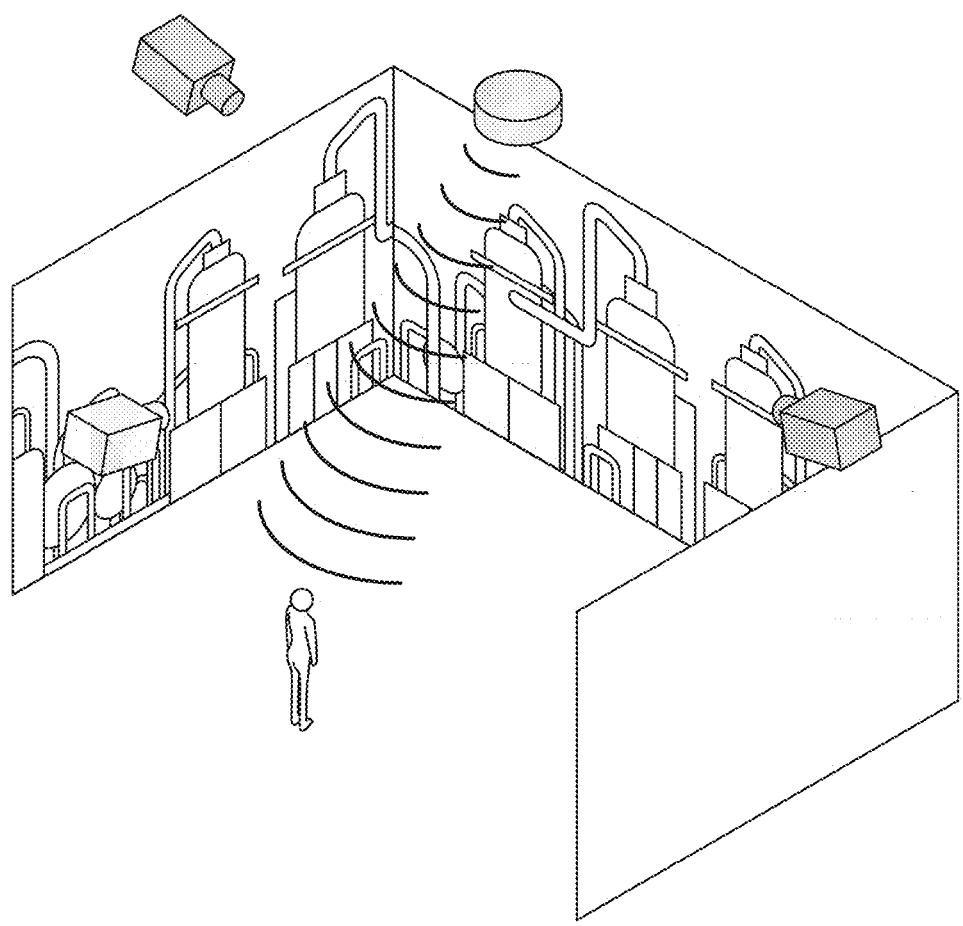
FIG. 12 is a view of an example of a three-dimensional cave projector as a virtual environment reproducer with a motion sensing system of the computer-implemented training systems of FIGS. 1-6.
Figure 13:
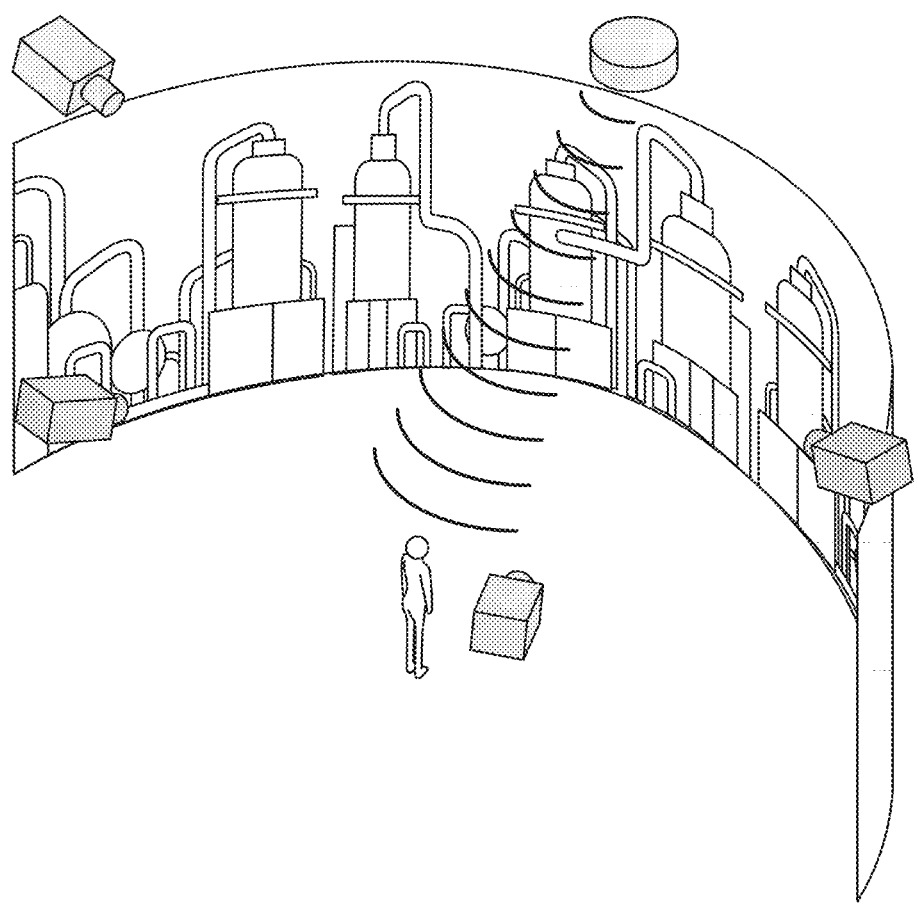
FIG. 13 is a view of another example of a three-dimensional curved projector as a virtual environment reproducer with a motion sensing system of the computer-implemented training systems of FIGS. 1-6.
Figure 14:
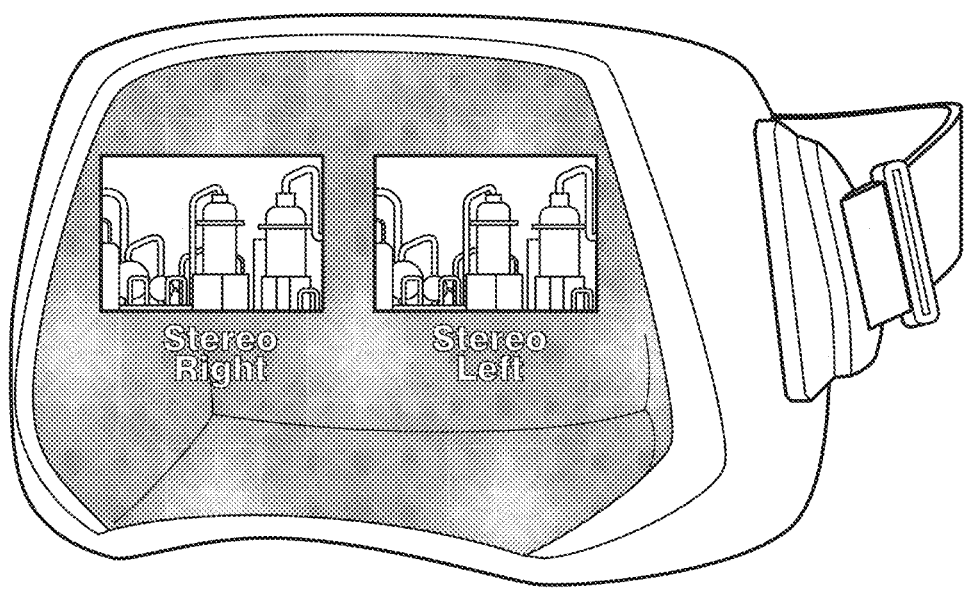
FIG. 14 is a view of another example of a stereoscopic head mounded display with a gyroscopic tracker of the computer-implemented training systems of FIGS. 1-6.

Any devices or systems can be available as the virtual environment reproducer 230 with the motion sensing system 250. FIG. 12 is a view of an example of a three-dimensional cave projector as the virtual environment reproducer 230 with the motion sensing system 250. FIG. 13 is a view of another example of a three-dimensional curved projector as the virtual environment reproducer 230 with the motion sensing system 250. The motion sensing system and/or the virtual environment reproducer can be any available wearable devices. The motion sensing system includes a motion sensor configured to be wearable by the first trainee; and a motion tracker configured to detect the motion sensor. The virtual environment reproducer includes a wearable display configured to display an image of the virtual environment. FIG. 14 is a view of another example of a stereoscopic head mounded display with a gyroscopic tracker as the virtual environment reproducer 230 with the wearable motion sensing system 250.

The computer-implemented training system 1000 is configured to allow the operation training system 100 and the virtual environment producing system 200 each to obtain all the first type of update, the second type of update and the third type of update. The computer-implemented training system 1000 is configured to allow the virtual environment reproducer 230 for the field operator trainee to reproduce the updated virtual environment which is reflected by the updated scenario of the trainer, the updated console operations of the console operator trainee, and the updated motions or responses of the field operator trainee. The computer-implemented training system 1000 is configured to allow the supervisory system 170 for the trainer to display the updated scenario of the trainer, the updated console operations of the console operator trainee, and the updated motions or responses of the field operator trainee. The computer-implemented training system 1000 is configured to allow the distributed control system (DCS) operator control system 150 for the console operator trainee to display the updated scenario of the trainer, the updated console operations of the console operator trainee, and the updated motions or responses of the field operator trainee. The computer-implemented training system 1000 is configured for the field operator trainee and the console operator trainee to perform a series of training operations, in the coordinated way of the training scenario set by the trainer. The computer-implemented training system 1000 is configured for the field operator trainee and the console operator trainee to perform a series of training operations, in the coordinated way of the training scenario set by the trainer, and for the trainer to supervise the field operator trainee and the console operator trainee.

The computer-implemented training system 1000 is configured to continue to update, during the training session, the data held by the operation training system 100 and the virtual environment producing system 200. In some cases, the training session can be completed by the instruction by the trainer entered into the supervisory system 170. In other cases, the training session can be completed by the operator training server 110 when the operator training server 110 recognizes the training session to be completed.

The knowledge management system 300 is configured to support for taking place training tests for the field operator trainee and the console operator trainee in at least one of 1) standard operating procedures, 2) start-up and shutdown procedures, 3) emergency procedures, and 4) best practices. The knowledge management system 300 is configured to store new best practices from training session using the computer-implemented training system 1000. The knowledge management system 300 is configured to output a variety of reports of any records related to the training after the training session has completed.

Figure 3:
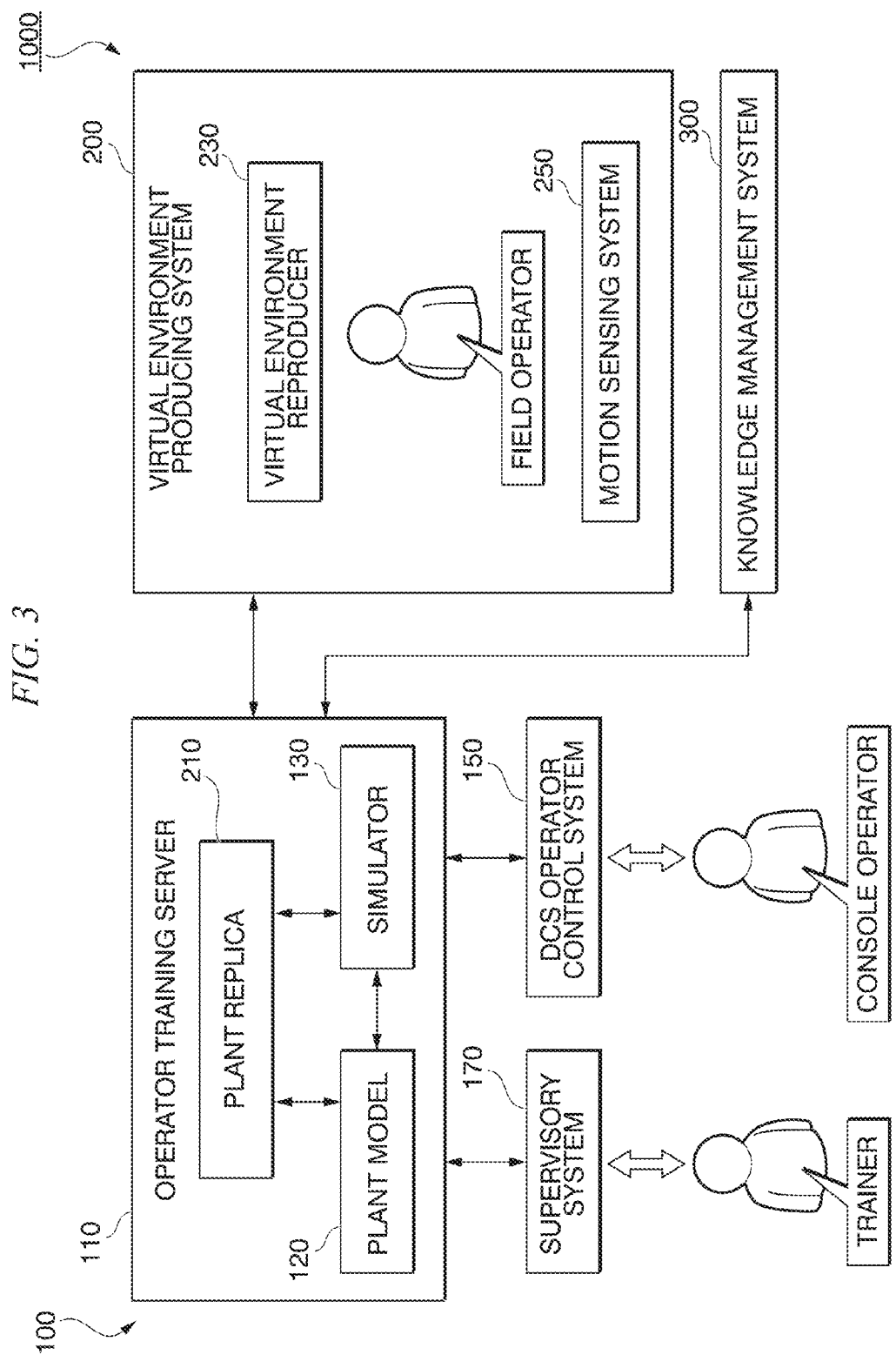
FIG. 3 is a block diagram of a modified illustrative example of the configurations of the computer-implemented training system of FIG. 2.

FIG. 3 is a block diagram of a modified illustrative example of the configurations of the computer-implemented training system 1000 of FIG. 2. The computer-implemented training system 1000 of FIG. 3 has a different configuration from that of FIG. 2 in that the operator training server 110 has the plant replica 210 in addition to the plant model 120 and the simulator 120, and the virtual environment producing system 200 is free of the plant replica 210. In other words, the plant replica 210 may be either in the virtual environment producing system 200 or the operator training system 110. The computer-implemented training system 1000 of FIG. 3 will have the same performances, functions and operations as the computer-implemented training system 1000 of FIG. 2.

Figure 4:
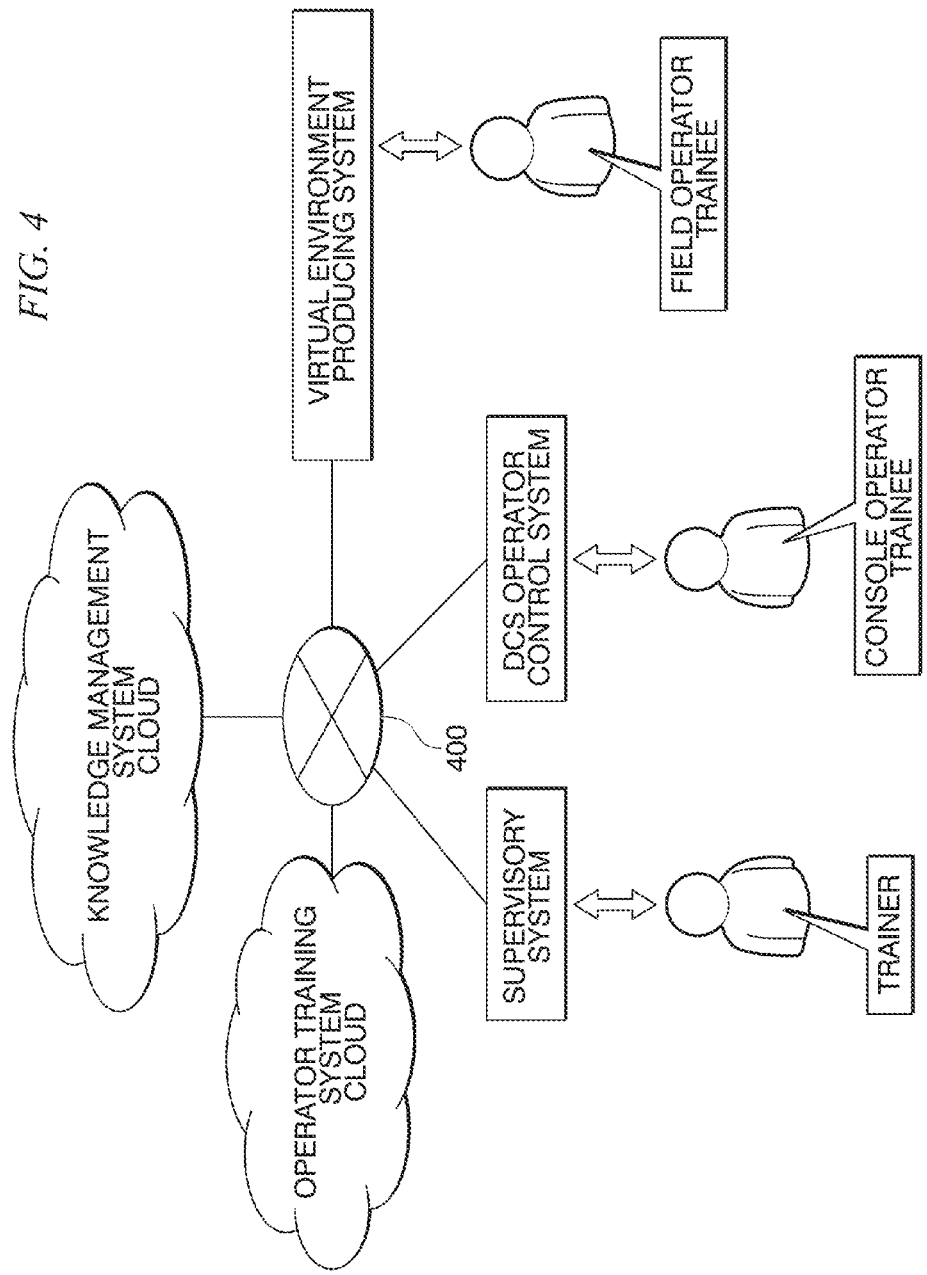
FIG. 4 is a block diagram of another example of the computer-implemented training system.

FIG. 4 is a block diagram of another example of the computer-implemented training system 1000. The computer-implemented training system 1000 of FIG. 4 has a different configuration from that of FIG. 3 in that the operator training system 100 and the knowledge management system 300 can be each implemented by the cloud computing technologies. This example of the computer-implemented training system 1000 of FIG. 4 is that all functions of the computer-implemented training system 1000 can be implemented by the cloud computing technologies except for the interfaces to the trainer, the console operator trainee and the field operator trainee, namely, for the supervisory system 170 for the trainer, the distributed control system (DCS) operator control system 150 for the console operator trainee, and the combination of the virtual environment reproducer 230 and the motion sensing system 250 for the field operator trainee. The computer-implemented training system 1000 of FIG. 4 will have the same performances, functions and operations as the computer-implemented training system 1000 of FIGS. 2 and 3.

Figure 5:
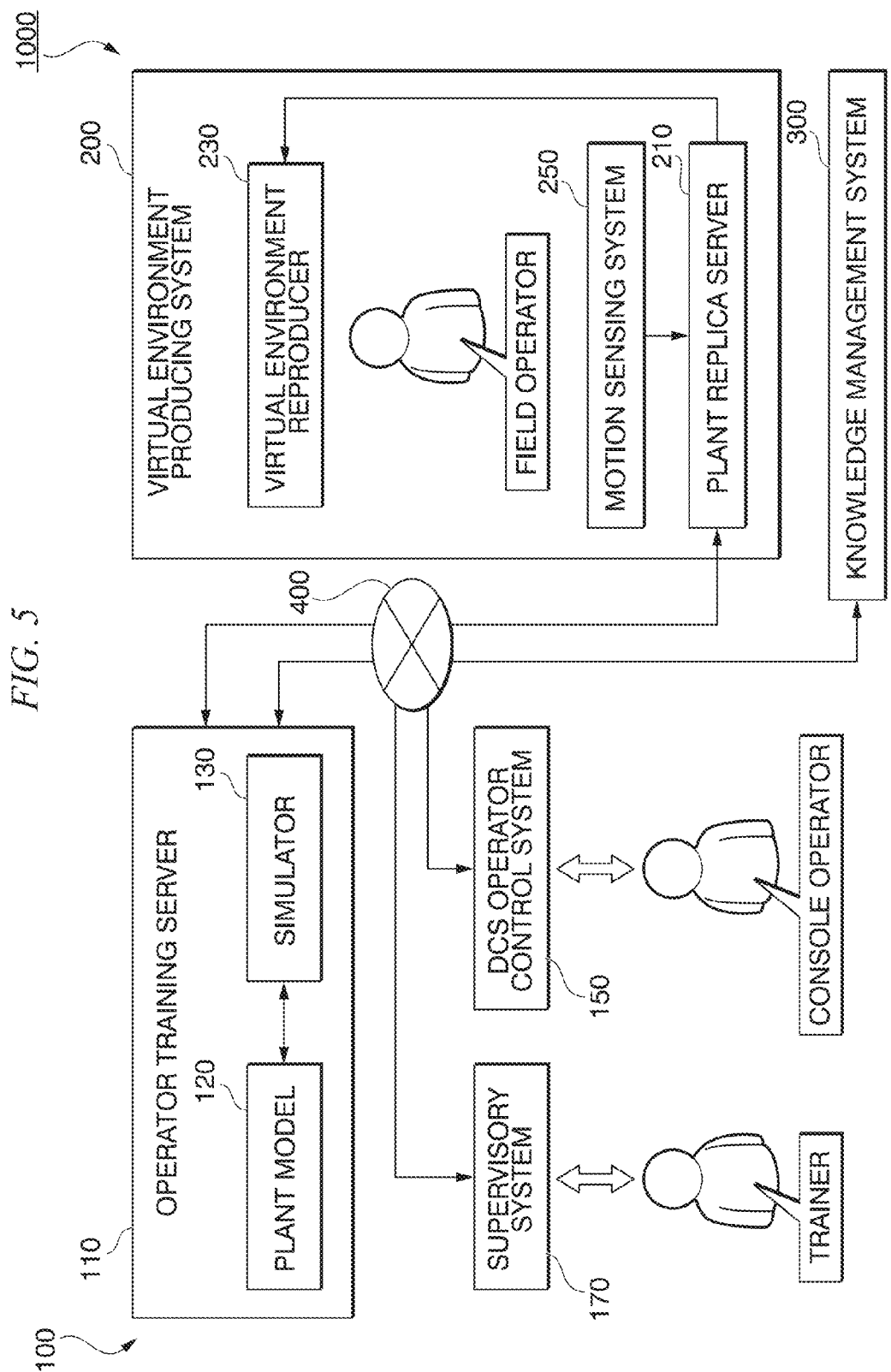
FIG. 5 is a block diagram of still another example of the computer-implemented training system.

FIG. 5 is a block diagram of still another example of the computer-implemented training system 1000. The computer-implemented training system 1000 of FIG. 5 has a different configuration from those of FIGS. 2, 3 and 4 in that each of the supervisory system 170 and the distributed control system (DCS) operator control system 150 is connected through the network 400 to each of the operator training system 100, the virtual environment producing system 200, and the knowledge management system 300. The computer-implemented training system 1000 of FIG. 5 will have the same performances, functions and operations as the computer-implemented training system 1000 of FIGS. 2, 3 and 4.

The various examples of the computer-implemented training system 1000 described above with reference to FIGS. 1, 2, 3, 4 and 5 are the integrated training system accessible to all, the trainer, the console operator trainee and the field operator trainee.

Figure 6:
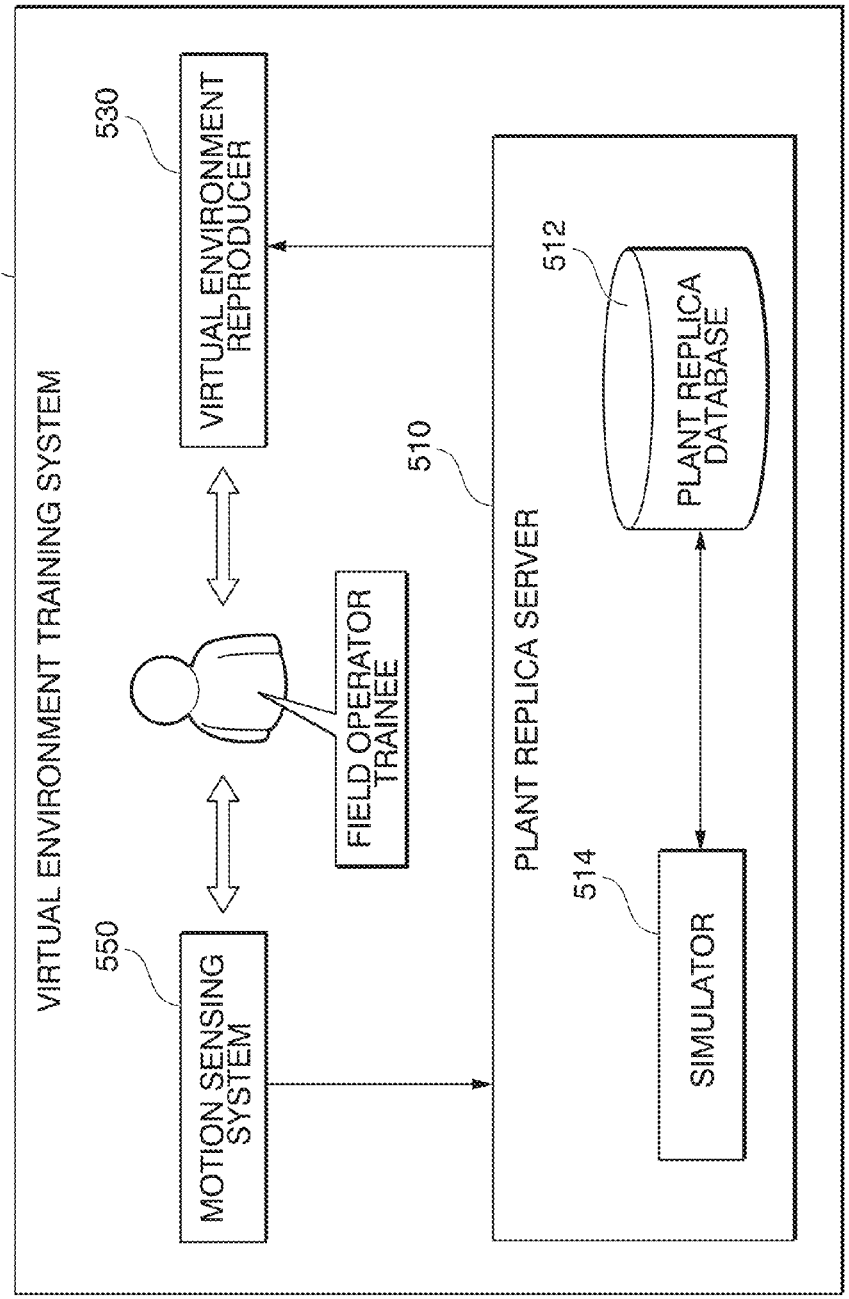
FIG. 6 is a block diagram of a computer-implemented training system in other embodiments of the present invention.

FIG. 6 is a block diagram of a computer-implemented training system in other embodiments of the present invention. A computer-implemented training system 2000 is configured to train a field operator trainee alone. The computer-implemented training system 2000 is simpler than the above-described integrated system 1000. The computer-implemented training system 2000 is configured for the field operator trainee to perform a series of training operations, in a non-coordinated way of a training scenario which has previously set. The computer-implemented training system 2000 is configured to support the field operator trainee to work alone. The computer-implemented training system 2000 is configured to reproduce a virtual environment of a simulated plant model so as to place the field operator trainee in the virtual environment of the plant model. The computer-implemented training system 2000 is configured to update the virtual environment so as to allow the field operator trainee to work in response to the training scenario.

The computer-implemented training system 2000 can be implemented by a virtual environment training system which is different from the virtual environment producing system 200 of the computer-implemented training system 2000. The computer-implemented training system 2000 as the virtual environment training system includes a plant replica server 510, a virtual environment reproducer 530 and a motion sensing system 550. The plant replica server 510 includes a plant replica database 512 and a simulator 514. The computer-implemented training system 2000 has the simulator 514 in the plant replica server 510. The computer-implemented training system 1000 described above with reference to FIGS. 1 through 5 is configured to allow the virtual environment training system 200 to share the function of the simulator 130 in the operator training system 100. The computer-implemented training system 2000 as the stand alone type is configured to have the simulator 514 in the plant replica server 510.

The plant replica database 512 stores plant-model-related data which is related to plant model for virtual training. The plant replica server 510 is configured to have the simulator 514 simulate the plant model in accordance with the conditions for simulation and generate a simulated plant model. The plant replica server 510 is configured to store the simulated plant model. The plant replica server 510 is configured to send the plant-model-related-data which is associated with the simulated plant model for allowing the field operator trainee to train alone using the simulated plant model and in accordance with the previously set training scenario.

The virtual environment reproducer 530 is communicatively coupled to the plant replica server 210. The virtual environment reproducer 530 is configured to receive the updated plant-model-related data from the plant replica server 510 and to reproduce the virtual environment using the updated plant-model-related data. The virtual environment reproducer 530 can be implemented by any available projector configured to display an image of the virtual environment.

The motion sensing system 550 is communicatively coupled to the plant replica server 510. The motion sensing system 550 is configured to sense motions of the field operator trainee acting in the virtual environment and in response to the training scenario. The motion sensing system 550 is configured to generate update signals associated with the sensed motions or the field operator trainee's response. The motion sensing system 550 is configured to send the update associated with the sensed motions to the plant replica server 510. The virtual environment reproducer 530 is configured to receive the update associated with the sensed motions from the plant replica server 510 and reproduce newly updated motions of the field operator trainee in the virtual environment. In other words, the virtual environment reproducer 530 is configured to reproduce newly updated virtual environment which is reflected by the sensed motions or the updated response to the training scenario.

The computer-implemented training system 2000 is configured to allow the virtual environment training system 200 to obtain update associated with the motions or responses by the field operator trainee. The computer-implemented training system 2000 is configured to allow the virtual environment reproducer 530 for the field operator trainee to reproduce the updated virtual environment which is reflected by the updated motions or responses of the field operator trainee. The computer-implemented training system 2000 is configured for the field operator trainee to perform a series of training operations, in the non-coordinated way of the training scenario. The computer-implemented training system 2000 is configured for the field operator trainee and the console operator trainee to perform a series of training operations, in the coordinated way of the training scenario set by the trainer, and for the trainer to supervise the field operator trainee and the console operator trainee.

[Operations of Training System]

Figure 7:
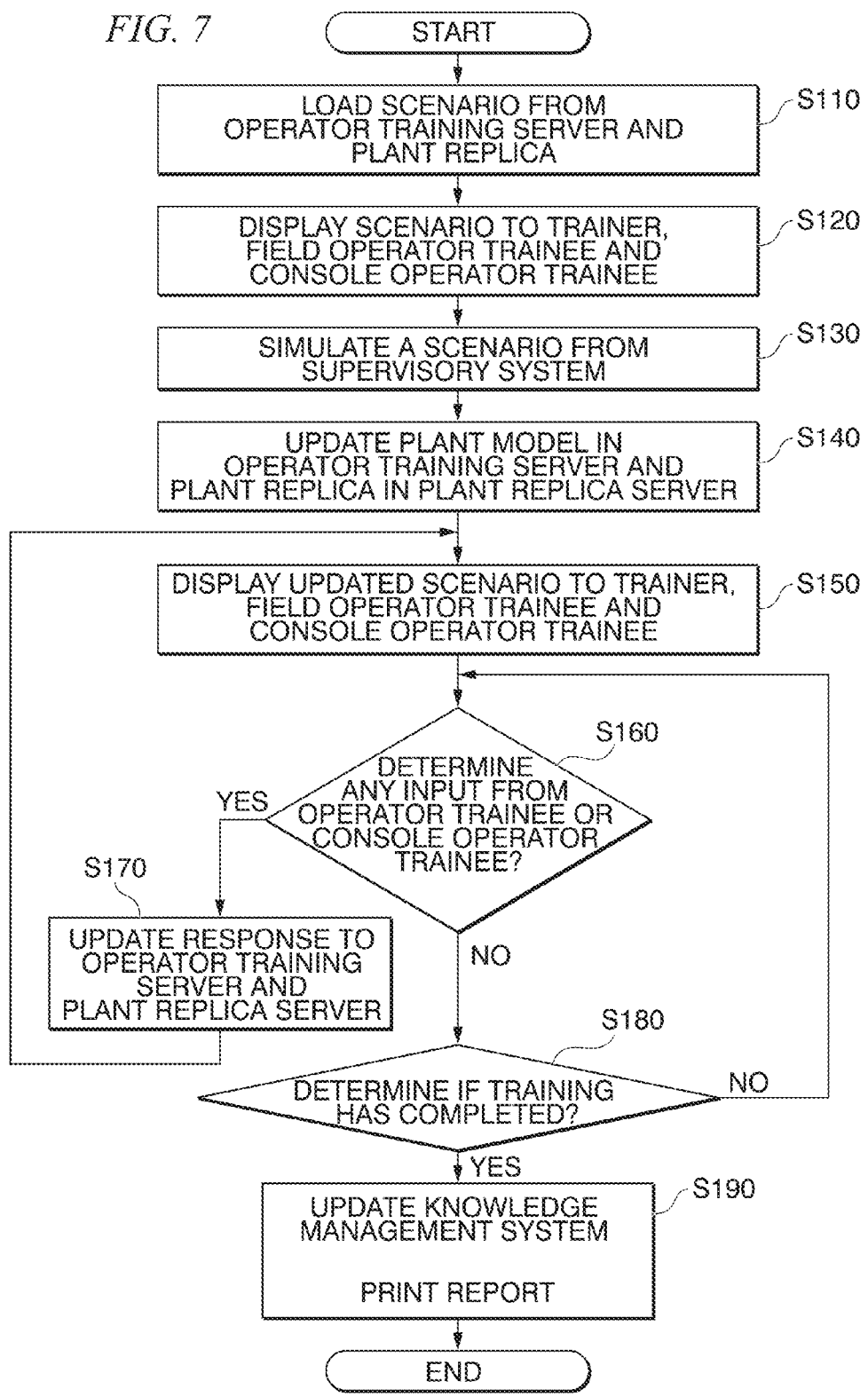
FIG. 7 is a flow chart of operations of the computer-implemented training systems of FIGS. 1-5.

Operations of the computer-implemented training system 1000 described above will be described with reference to FIG. 7 which is a flow chart of operations of the systems of FIGS. 1-5.

In Step S110, the supervisory system 170 loads the scenario from the operator training system 100. The distributed control system (DCS) operator control system 150 loads the scenario from the operator training system 100. The virtual environment reproducer 230 loads the scenario from the plant replica server 210.

In Step S120, the supervisory system 170 displays the scenario to the trainer. The distributed control system (DCS) operator control system 150 displays the scenario to the console operator trainee. The virtual environment reproducer 230 reproduces or displays the scenario to the field operator trainee.

In Step S130, instructions and conditions for simulations are entered through the supervisory system 170 to have the simulator 130 simulate the plant model or the training scenario.

In Step S140, the operator training server 110 updates the plant model or the scenario. The plant replica server 210 updates the plant replica or the scenario.

In Step S150, update is made to the scenario which is displayed by the supervisory system 170 to the trainer. Update is made to the scenario which is displayed by the distributed control system (DCS) operator control system 150 to the console operator trainee. Update is made to the scenario which is displayed by the virtual environment reproducer 230 to the field operator trainee.

In Step S160, the distributed control system (DCS) operator control system 150 determines if any input is made of console operation by the console operator trainee. The motion sensing system 250 determines any input is made of motions or responses by the field operator trainee.

In Step S170, if the distributed control system (DCS) operator control system 150 determines that a certain input is made of console operation by the console operator trainee, then the distributed control system (DCS) operator control system 150 sends the input to the operator training server 110 and to the virtual environment reproducing system 200 so that the operator training server 110 and the plant replica server 210 each update the console operation by the console operator trainee. If the motion sensing system 250 determines that a certain input is made of motions or responses by the field operator trainee, then the virtual environment reproducing system 200 sends the input to the operator training server 110 so that the operator training server 110 and the plant replica server 210 each update the motions or responses by the field operator trainee. Then, the process will go back to Step S150, in which updates are made to the scenario which are displayed by the supervisory system 170 to the trainer, by the distributed control system (DCS) operator control system 150 to the console operator trainee, and by the virtual environment reproducer 230 to the field operator trainee. The field operator trainee and the console operator trainee both will be aware of consequences of other's actions to work together in the coordinated way to handle the current status.

In Step S160, if the distributed control system (DCS) operator control system 150 and the motion sensing system 250 both determine that no input is made of console operation by the console operator trainee and no input of motions or response by the field operator trainee, then the process will go to Step 180 in which the operation training server 110 determines if the training has completed.

In Step 180, if the operation training server 110 determines that the training has not yet completed, then the process will go back to Step S160. If the operation training server 110 determines that the training has completed, then the process will go to Step S190.

In Step 190, the operation training server 110 sends the results of the training in this training session to the knowledge management system 300 to update the current records in the knowledge management system 300, and the knowledge management system 300 will output the reports which are reflected by the results of the training, and the processes will be completed.

Figure 8:
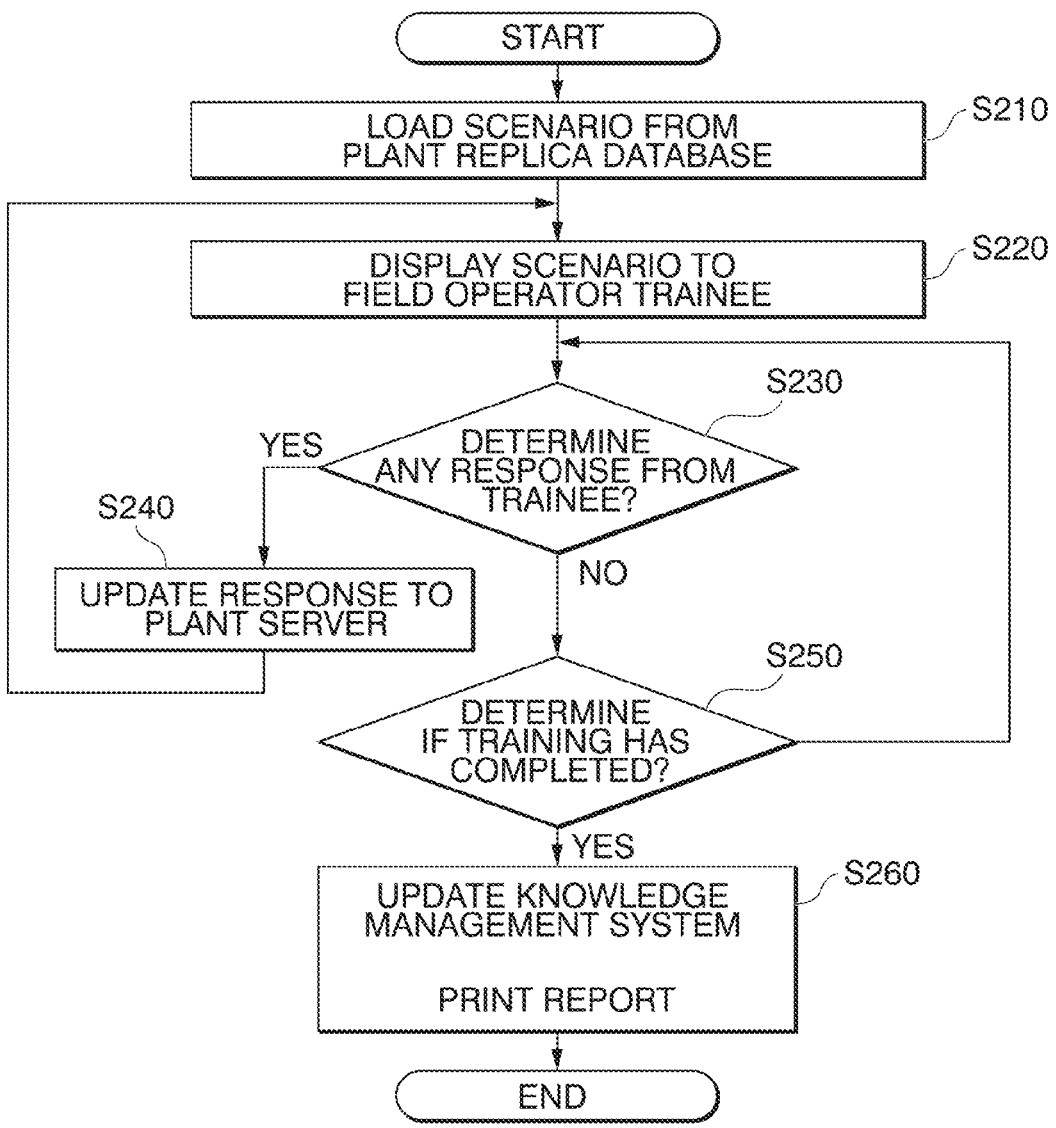
FIG. 8 is a flow chart of operations of the computer-implemented training system of FIG. 6.

Operations of the computer-implemented training system 2000 described above will be described with reference to FIG. 8 which is a flow chart of operations of the systems of FIG. 6.

In Step S210, the virtual environment reproducer 530 loads the scenario from the plant replica database 512.

In Step S220, the virtual environment reproducer 530 reproduces or displays the scenario to the field operator trainee.

In Step S230, the motion sensing system 550 determines any response or motion is made by the field operator trainee.

In Step S240, if the motion sensing system 550 determines that a certain input is made of motions or responses by the field operator trainee, then the plant replica server 510 updates the motions or responses by the field operator trainee. Then, the process will go back to Step S220, in which the virtual environment reproducer 530 reproduces or displays the updated scenario to the field operator trainee.

In Step S230, if the motion sensing system 550 determines no input of motions or response by the field operator trainee, then the process will go to Step 250 in which the plant replica server 510 determines if the training has completed.

In Step 250, if the plant replica server 510 determines that the training has not yet completed, then the process will go back to Step S230. If the plant replica server 510 determines that the training has completed, then the process will go to Step S260.

In Step 260, the plant replica server 510 sends the results of the training in this training session to the knowledge management system which is out of the virtual environment training system to update the current records in the knowledge management system, and the knowledge management system will output the reports which are reflected by the results of the training, and the processes will be completed.

Each of the integrated system 1000 and the standalone system 2000 will provide a realistic virtual environment for the trainees with the opportunity for extended practice sessions. Each of the integrated system 1000 and the standalone system 2000 will improve the environmental, health and safety compliances by promoting safer shutdowns and turnarounds and lowering emissions. Each of the integrated system 1000 and the standalone system 2000 will boost the field operator's knowledge and the console operator's knowledge, and capture the best practices procedures, the site-specific processes and reducing operator's errors or mistakes. Each of the integrated system 1000 and the standalone system 2000 will decrease upfront training costs for new personnel and reduce maintenance budges.

In one aspect of the present invention, a computer-implemented training system may include, but is not limited to, a) an operator training server; b) a plant replica server; c) a virtual environment reproducer; d) a motion sensing system; and e) a first user interface. The operator training server may include, but is not limited to, a-i) a plant model and a-ii) a simulator. The plant model is configured to provide plant-model-related data that is related to at least a plant model with virtual environments. The simulator is configured to generate a simulated plant model, in accordance with input conditions for simulation. The plant replica server is communicatively coupled to the operator training system. The plant replica server has a plant replica associated with the simulated plant model. The virtual environment reproducer is communicatively coupled to the plant replica server. The virtual environment reproducer is configured to reproduce a virtual environment of the simulated plant model generated by the simulator, based on the plant replica provided by the plant replica server. The motion sensing system is communicatively coupled to the plant replica server. The motion sensing system is configured to sense motions of a field operator as a first trainee acting in the virtual environment. The motion sensing system is configured to send a first type of update associated with the sensed motions to the plant replica server and the operation training server, and to allow the plant replica server to reflect the first type of update to the virtual environment reproduced by the virtual environment reproducer. The first user interface is communicatively coupled to the operator training server. The first user interface is configured for a trainer to set conditions in the plant model for generating a training scenario. The first user interface is configured to send a second type of update associated with the training scenario to the operation training server and the plant replica server, and to allow the plant replica server to reflect the second type of update to the virtual environment reproduced by the virtual environment reproducer.

In some cases, the plant replica server is configured to receive the first type of update associated with the sensed motions from the motion sensing system and to update the plant replica based on the first type of update associated with the sensed motions. The plant replica server is configured to receive the second type of update associated with the training scenario from the operator training server and to update the plant replica based on the second type of update associated with the training scenario. The plant replica server is configured to provide the virtual environment reproducer with the updated plant replica that is updated by the first type of update associated with the sensed motions and by the second type of update associated with the training scenario. The virtual environment reproducer is configured to receive the updated plant replica from the plant replica server and to reproduce the virtual environment, based on the plant replica that is reflected by the training scenario and the sensed motions of the field operator.

In the above-described cases, the operator training server is configured to receive the first type of update associated with the sensed motions from the plant replica server and to update the plant model based on the first type of update associated with the sensed motions. The operator training server is configured to receive the second type of update associated with the training scenario from the first user interface, and to update the simulated plant model, based on the second type of update associated with the sensed motions and the second type of update associated with the training scenario.

In the above-described cases, the operator training server is configured to receive the plant replica that is reflected by the training scenario and the sensed motions of the field operator from the plant replica server, and to send the plant replica that is reflected by the training scenario and the sensed motions of the field operator to the first user interface. The first user interface is configured to display the plant model that is reflected by the training scenario, and by the sensed motions of the field operator.

In some cases, the computer-implemented training system may further include, but is not limited to, f) a second user interface. The second user interface is communicatively coupled to the operator training server. The second user interface is configured for a console operator as a second trainee to operate a console. The second user interface is configured to send a third type of update associated with input signals of console operation by the console operator to the operation training server and the plant replica server, and to reflect the third type of update to the virtual environment reproduced by the virtual environment reproducer.

In the above-described cases, the plant replica server is configured to receive the first type of update associated with the sensed motions from the motion sensing system and to update the plant replica based on the first type of update associated with the sensed motions. The plant replica server is configured to receive the second type of update associated with the training scenario from the operator training server and to update the plant replica based on the second type of update associated with the training scenario. The plant replica server is configured to receive the third type of update associated with input signals of the console operation by the console operator from the operator training server. The plant replica server is configured to provide the virtual environment reproducer with the updated plant replica that is updated by the first type of update associated with the sensed motions, by the second type of update associated with the training scenario, and by the third type of update associated with input signals of the console operation. The virtual environment reproducer is configured to receive the updated plant replica from the plant replica server and to reproduce the virtual environment, based on the plant replica that is reflected by the training scenario, by the sensed motions of the field operator, and by the console operation by the console operator.

In the above-described cases, the operator training server is configured to receive the first type of update associated with the sensed motions from the plant replica server and to update the plant model based on the first type of update associated with the sensed motions. The operator training server is configured to receive the second type of update associated with the training scenario from the first user interface, and to update the simulated plant model, based on the second type of update associated with the sensed motions and the second type of update associated with the training scenario. The operator training server is configured to receive the third type of update associated with input signals of the console operation by the console operator from the second user interface, and to send the input signals of the console operation by the console operator to the first user interface and to the plant replica server.

In the above-described cases, the operator training server is configured to receive the plant replica that is reflected by the training scenario, by the sensed motions of the field operator, and by the console operation by the console operator from the plant replica server, and to send the plant replica to the first user interface and the second user interface. The first user interface is configured to display the plant model that is reflected by the training scenario, by the sensed motions of the field operator, and by the console operation by the console operator.

In some cases, the virtual environment reproducer may include, but is not limited to, a projector configured to display an image of the virtual environment.

In some cases, the motion sensing system may include, but is not limited to, a motion sensor configured to detect motions of body parts of the field operator recognizing the image of the virtual environment displayed by the projector.

In some cases, the motion sensing system may include, but is not limited to, a motion sensor configured to be wearable by the first trainee; and a motion tracker configured to detect the motion sensor.

In some cases, the virtual environment reproducer may include, but is not limited to, a wearable display configured to display an image of the virtual environment.

In some cases, the computer-implemented training system may include, but is not limited to, a knowledge management system communicatively coupled to the operator training server and the plant replica server. The knowledge management system is configured to perform at least one of: testing at least one of the field operator as the first trainee and the console operator as a second trainee in at least one of 1) standard operating procedures, 2) start-up and shutdown procedures, 3) emergency procedures, and 4) best practices; and storing new best practices from training session using the computer-implemented training system.

In another aspect of the present invention, a computer-implemented training system may include, but is not limited to, a) a plant replica server; b) a virtual environment reproducer; and c) a motion sensing system. The plant replica server includes a-i) a plant replica database configured to store one or more plant replicas; and a-ii) a simulator configured to generate a simulated plant model, in accordance with input conditions for simulation. The virtual environment reproducer is communicatively coupled to the plant replica server. The virtual environment reproducer is configured to reproduce a virtual environment related to the simulated plant model. The motion sensing system is configured to sense motions of a field operator as a first trainee acting in the virtual environment. The motion sensing system is communicatively coupled to the plant replica server and to send a first type of update associated with the sensed motions to the plant replica server, and to allow the plant replica server to reflect the first type of update to the virtual environment reproduced by the virtual environment reproducer.

In some cases, the plant replica server is configured to receive the first type of update associated with the sensed motions from the motion sensing system and to update the plant replica on the plant replica database, based on the first type of update associated with the sensed motions. The plant replica server is configured to provide the virtual environment reproducer with the updated plant replica that is updated by the first type of update associated with the sensed motions. The virtual environment reproducer is configured to receive the updated plant replica from the plant replica server and to reproduce the virtual environment, based on the plant replica that is reflected by the sensed motions of the field operator.

In some cases, the virtual environment reproducer may include, but is not limited to, a projector configured to display an image of the virtual environment.

In some cases, the motion sensing system may include, but is not limited to, a motion sensor configured to detect motions of body parts of the field operator recognizing the image of the virtual environment displayed by the projector.

In some cases, the motion sensing system may include, but is not limited to, a motion sensor configured to be wearable by the first trainee; and a motion tracker configured to detect the motion sensor.

In some cases, the virtual environment reproducer may include, but is not limited to, a wearable display configured to display an image of the virtual environment.

In still another aspect of the present invention, a computer-implemented training system may include, but is not limited to, a) a plant replica server; b) a virtual environment reproducer; and c) a motion sensing system. The plant replica server is configured to obtain a simulated plant model. The plant replica server has a plant replica associated with the simulated plant model. The virtual environment reproducer is communicatively coupled to the plant replica server. The virtual environment reproducer is configured to reproduce a virtual environment of the simulated plant model, based on the plant replica. The motion sensing system is communicatively coupled to the plant replica server. The motion sensing system is configured to sense motions of a field operator as a first trainee acting in the virtual environment. The motion sensing system is configured to send a first type of update associated with the sensed motions to the plant replica server. The plant replica server is configured to receive the first type of update associated with the sensed motions from the motion sensing system, and to update the plant replica based on the first type of update associated with the sensed motions, and to reflect the first type of update to the virtual environment reproduced by the virtual environment reproducer.

In some cases, the computer-implemented training system may include, but is not limited to, d) a first user interface configured for a trainer to set conditions in the plant model for generating a training scenario. The first user interface is configured to send a second type of update associated with the training scenario to the plant replica server.

In some cases, the plant replica server is configured to receive the second type of update associated with the training scenario from the first user interface and to update the plant replica based on the second type of update associated with the training scenario. The plant replica server is configured to provide the virtual environment reproducer with the updated plant replica that is updated by the first type of update associated with the sensed motions and by the second type of update associated with the training scenario. The virtual environment reproducer is configured to receive the updated plant replica from the plant replica server and to reproduce the virtual environment, based on the plant replica that is reflected by the training scenario and the sensed motions of the field operator.

In the above-described cases, the computer-implemented training system may include, but is not limited to, e) a second user interface configured for a console operator as a second trainee to operate a console. The second user interface is configured to send a third type of update associated with input signals of console operation by the console operator to the plant replica server, and to allow the plant replica server to reflect the third type of update to the virtual environment reproduced by the virtual environment reproducer.

In yet another aspect of the invention, a method of training an operator using a computer-implemented training system may include: reproducing, by using a virtual environment reproducer, a virtual environment of a simulated plant model, based on a plant replica associated with the simulated plant model; sensing, a motion sensing system, motions of a field operator as a first trainee acting in the virtual environment; updating, by a computer, the plant replica with a first type of update associated with the sensed motions; and reproducing, by using the virtual environment reproducer, the updated virtual environment which is reflected by the sensed motions.

The term "configured" is used to describe a component, section or part of a device includes hardware alone or in combination with software that is constructed and/or programmed to carry out the desired function.

The embodiments of methods, software, firmware or codes described above may be implemented by instructions or codes stored on a machine-accessible or machine readable medium. The instructions or codes are executable by a processing element or processing unit. The machine-accessible/readable medium may include, but is not limited to, any mechanisms that provide, store and/or transmit information in a form readable by a machine, such as a computer or electronic system. In some cases, the machine-accessible/readable medium may include, but is not limited to, random-access memories (RAMs), such as static RAM (SRAM) or dynamic RAM (DRAM), read-only memory (ROM), magnetic or optical storage medium and flash memory devices. In other cases, the machine-accessible/readable medium may include, but is not limited to, any mechanism that receives, copies, stores, transmits, or otherwise manipulates electrical, optical, acoustical or other form of propagated signals such as carrier waves, infrared signals, digital signals, including the embodiments of methods, software, firmware or code set forth above.

Furthermore, the particular features, structures, or characteristics may be combined in any suitable manner in one or more embodiments.

It is apparent that the present invention is not limited to the above embodiments, but may be modified and changed without departing from the scope and spirit of the invention.

What is claimed is:

1. A computer-implemented training system comprising:
   a) an operator training server including:
      a-i) a plant model configured to provide plant-model-related data that is related to at least a plant model with virtual environments; and
      a-ii) a simulator configured to generate a simulated plant model, in accordance with input conditions for simulation;
   b) a plant replica server communicatively coupled to the operator training server, the plant replica server having a plant replica associated with the simulated plant model, wherein the plant replica provides scaled dimensions of each structure in three-dimensions and relative distances between structural, elements of a plant;
   c) a virtual environment reproducer communicatively coupled to the plant replica server, the virtual environment reproducer being configured to receive updated plant-model-related data from the simulator, the virtual environment reproducer being configured to reproduce an updated virtual environment of the simulated plant model generated by the simulator, based on the plant replica provided by the plant replica server, and based on the updated plant-model-related data from the simulator;
   d) a motion sensing system communicatively coupled to the plant replica server, the motion sensing system being configured to sense motions of a field operator as a first trainee acting in the virtual environment, the motion sensing system being configured to send a first type of update associated with the sensed motions to the plant replica server and the operator training server, and to allow the plant replica server to reflect the first type of update to the virtual environment reproduced by the virtual environment reproducer;
   e) a first user interface communicatively coupled to the operator training server, the first user interface being configured to receive the simulated plant model and a training scenario from the simulator and display the simulated plant model and training scenario, the first user interface being configured for a trainer to set conditions in the plant model for generating a second type of update associated with the training scenario, and the first user interface being configured to send the second type of update associated with the training scenario to the operator training server and the plant replica server, and to allow the plant replica server to reflect the second type of update to the virtual environment reproduced by the virtual environment reproducer; and
   f) a second user interface communicatively coupled to the operator training server, the second user interface being configured to receive the simulated plant model and training scenario from the simulator and display the simulated plant model and training scenario, the second user interface being configured for a console operator to operate a console, and the second user interface being configured to send a third type of update associated with input signals of console operation by the console operator to the operator training server and the plant replica server, and to reflect the third type of update to the virtual environment reproduced by the virtual environment reproducer.

2. The computer-implemented training system according to claim 1, wherein the virtual environment reproducer comprises a projector configured to display an image of the virtual environment.

3. The computer-implemented training system according to claim 2, wherein the motion sensing system comprises a motion sensor configured to detect motions of body parts of the field operator recognizing the image of the virtual environment displayed by the projector.

4. The computer-implemented training system according to claim 1, wherein the motion sensing system comprises:
   a motion sensor configured to be wearable by the first trainee; and
   a motion tracker configured to detect the motion sensor.

5. The computer-implemented training system according to claim 1, wherein the virtual environment reproducer comprises a wearable display configured to display an image of the virtual environment.

6. The computer-implemented training system according to claim 1, further comprising:
   a knowledge management system communicatively coupled to the operator training server and the plant replica server, the knowledge management system being configured to perform at least one of:
      testing at least one of the field operator as the first trainee and the console operator as a second trainee in at least one of 1) standard operating procedures, 2) start-up and shutdown procedures, 3) emergency procedures, and 4) best practices; and
   storing new best practices from training session using the computer-implemented training system.

* * * * *